(12) United States Patent
Filatov (10) Patent No.: US 8,378,543 B2
(45) Date of Patent: Feb. 19, 2013

(54) GENERATING ELECTROMAGNETIC FORCES IN LARGE AIR GAPS

(75) Inventor: Alexei V. Filatov, Fullerton, CA (US)

(73) Assignee: Calnetix Technologies, L.L.C., Yorba Linda, CA (US)

( * ) Notice: Subject to any disclaimer, the term of this patent is extended or adjusted under 35 U.S.C. 154(b) by 765 days.

(21) Appl. No.: 12/610,766

(22) Filed: Nov. 2, 2009

(65) Prior Publication Data

US 2011/0101905 A1    May 5, 2011

(51) Int. Cl.
*H02K 7/09* (2006.01)
(52) U.S. Cl. .................................. 310/90.5
(58) Field of Classification Search ............ 310/90.5, 310/178, 179, 181
See application file for complete search history.

(56) References Cited

U.S. PATENT DOCUMENTS

| | | |
|---|---|---|
| 1,916,256 A | 7/1933 | Chandeysson |
| 2,276,695 A | 3/1942 | Lavarello |
| 2,345,835 A | 4/1944 | Serduke |
| 2,409,857 A | 10/1946 | Hines et al. |
| 2,917,636 A | 12/1959 | Akeley |
| 3,060,335 A | 10/1962 | Greenwald |
| 3,064,942 A | 11/1962 | Martin |
| 3,439,201 A | 4/1969 | Levy et al. |
| 3,943,443 A | 3/1976 | Kimura et al. |
| 4,093,917 A | 6/1978 | Haeussermann |
| 4,127,786 A | 11/1978 | Volkrodt |
| 4,170,435 A | 10/1979 | Swearingen |
| 4,260,914 A | 4/1981 | Hertrich |
| 4,358,697 A | 11/1982 | Liu et al. |
| 4,362,020 A | 12/1982 | Meacher et al. |
| 4,415,024 A | 11/1983 | Baker |
| 4,635,712 A | 1/1987 | Baker et al. |
| 4,639,665 A | 1/1987 | Gary |
| 4,642,501 A | 2/1987 | Kral et al. |
| 4,659,969 A | 4/1987 | Stupak |

(Continued)

FOREIGN PATENT DOCUMENTS

| | | |
|---|---|---|
| DE | 102006004836 A1 | 5/2007 |
| EP | 0774824 | 5/1997 |

(Continued)

OTHER PUBLICATIONS

Ehmann et al., "*Comparison of Active Magnetic Bearings With and Without Permanent Magnet Bias*," Ninth International Symposium on Magnetic Bearings, Lexington, Kentucky, Aug. 3-6, 2004, 6 pages.

(Continued)

*Primary Examiner* — Quyen Leung
*Assistant Examiner* — David Scheuermann
(74) *Attorney, Agent, or Firm* — Fish & Richardson P.C.

(57) ABSTRACT

An electromagnetic actuator generates electromagnetic forces across large radial gaps to support a body. The actuator has an actuator target having a rotational axis, and a target magnetic element arranged circumferentially around the rotational axis that has inner and outer magnetic poles. A cylindrical soft-magnetic target pole is magnetically coupled to the outer cylindrical magnetic pole of the target magnetic element. An actuator base includes radial poles arranged circumferentially around and radially spaced apart from the cylindrical soft-magnetic target pole. The radial poles and the cylindrical soft-magnetic target pole are magnetically coupled and define a plurality of magnetic control circuits. Control coils around the radial poles are configured to produce magnetic fluxes in the magnetic control circuits. The target magnetic element, the cylindrical soft-magnetic target pole, and the radial poles are magnetically coupled and define a magnetic bias circuit, the magnetic element producing magnetic flux in the magnetic bias circuit.

20 Claims, 9 Drawing Sheets

U.S. PATENT DOCUMENTS

| | | | |
|---|---|---|---|
| 4,740,711 | A | 4/1988 | Sato et al. |
| 4,806,813 | A | 2/1989 | Sumi et al. |
| 5,003,211 | A | 3/1991 | Groom |
| 5,083,040 | A | 1/1992 | Whitford et al. |
| 5,241,425 | A | 8/1993 | Sakamoto et al. |
| 5,315,197 | A | 5/1994 | Meeks et al. |
| 5,481,145 | A | 1/1996 | Canders et al. |
| 5,514,924 | A | 5/1996 | McMullen et al. |
| 5,559,379 | A | 9/1996 | Voss |
| 5,589,262 | A | 12/1996 | Kiuchi et al. |
| 5,627,420 | A | 5/1997 | Rinker et al. |
| 5,672,047 | A | 9/1997 | Birkholz |
| 5,739,606 | A | 4/1998 | Takahata et al. |
| 5,767,597 | A | 6/1998 | Gondhalekar |
| 5,831,431 | A | 11/1998 | Gottfried-Gottfried et al. |
| 5,942,829 | A | 8/1999 | Huynh |
| 5,994,804 | A | 11/1999 | Grennan et al. |
| 6,087,744 | A | 7/2000 | Glauning |
| 6,130,494 | A | 10/2000 | Schöb |
| 6,148,967 | A | 11/2000 | Huynh |
| 6,167,703 | B1 | 1/2001 | Rumez et al. |
| 6,191,511 | B1 | 2/2001 | Zysset |
| 6,259,179 | B1 | 7/2001 | Fukuyama et al. |
| 6,268,673 | B1 | 7/2001 | Shah et al. |
| 6,270,309 | B1 | 8/2001 | Ghetzler et al. |
| 6,304,015 | B1 | 10/2001 | Filatov et al. |
| 6,313,555 | B1 | 11/2001 | Blumenstock et al. |
| 6,325,142 | B1 | 12/2001 | Bosley et al. |
| 6,359,357 | B1 | 3/2002 | Blumenstock |
| 6,437,468 | B2 | 8/2002 | Stahl et al. |
| 6,465,924 | B1 | 10/2002 | Maejima |
| 6,664,680 | B1 | 12/2003 | Gabrys |
| 6,700,258 | B2 | 3/2004 | McMullen et al. |
| 6,727,617 | B2 | 4/2004 | McMullen et al. |
| 6,794,780 | B2 | 9/2004 | Silber et al. |
| 6,856,062 | B2 | 2/2005 | Heiberger et al. |
| 6,876,194 | B2 | 4/2005 | Lin et al. |
| 6,885,121 | B2 | 4/2005 | Okada et al. |
| 6,897,587 | B1 | 5/2005 | McMullen et al. |
| 6,925,893 | B2 | 8/2005 | Abe et al. |
| 6,933,644 | B2 | 8/2005 | Kanebako |
| 7,042,118 | B2 | 5/2006 | McMullen et al. |
| 7,557,480 | B2 | 7/2009 | Filatov |
| 7,635,937 | B2 | 12/2009 | Brunet et al. |
| 8,169,118 | B2 | 5/2012 | Filatov |
| 2001/0030471 | A1 | 10/2001 | Kanebako |
| 2002/0006013 | A1 | 1/2002 | Sato et al. |
| 2002/0175578 | A1 | 11/2002 | McMullen et al. |
| 2003/0155829 | A1 | 8/2003 | McMullen et al. |
| 2005/0093391 | A1 | 5/2005 | McMullen et al. |
| 2007/0056285 | A1 | 3/2007 | Brewington |
| 2007/0063594 | A1 | 3/2007 | Huynh |
| 2007/0164627 | A1 | 7/2007 | Brunet et al. |
| 2007/0200438 | A1 | 8/2007 | Kaminski et al. |
| 2007/0296294 | A1 | 12/2007 | Nobe et al. |
| 2008/0211355 | A1 | 9/2008 | Sakamoto et al. |
| 2008/0246373 | A1 | 10/2008 | Filatov |
| 2008/0252078 | A1 | 10/2008 | Myers et al. |
| 2009/0004032 | A1 | 1/2009 | Kaupert |
| 2009/0201111 | A1 | 8/2009 | Filatov |
| 2010/0090556 | A1 | 4/2010 | Filatov |
| 2010/0117627 | A1 | 5/2010 | Filatov |
| 2010/0301840 | A1 | 12/2010 | Filatov |
| 2011/0163622 | A1 | 7/2011 | Filatov et al. |
| 2011/0234033 | A1 | 9/2011 | Filatov et al. |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |

OTHER PUBLICATIONS

Meeks, "*Development of a Compact, Light Weight Magnetic Bearing*," paper to be presented at 26th Annual AIAA/SAE/ASME/ASEE Joint Propulsion Conference, Orlando, FL, Jul. 16-18, 1990, 9 pages.

U.S. Appl. No. 13/116,991, filed May 26, 2011, Filatov.

U.S. Appl. No. 13/045,379, filed Mar. 10, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it.orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Honeywell, "Genetron®245fa Applications Development Guide," (15 pages), 2000.

Hawkins, Lawrence A. et al., "*Analysis and Testing of a Magnetic Bearing Energy Storage Flywheel with Gain-Scheduled, Mimo Control*," Proceedings of ASME Turboexpo 2000, Munich, Germany, May 8-11, 2000, pp. 1-8.

McMullen, Patrick T. et al., "*Combination Radial-Axial Magnetic Bearing*," Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel*," 8th International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications*," 24th International PCIM Conference, Nuremberg, Germany, May 20-22, 2003, 6 pages.

Hawkins, Larry et al., "*Development of an AMB Energy Storage Flywheel for Industrial Applications*," 7th International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

Hawkins, Larry et al., "*Development of an AMB Energy Storage Flywheel for Commercial Application*," International Symposium on Magnetic Suspension Technology, Dresden, Germany, Sep. 2005, 5 pages.

Freepower ORC Electricity Company with Industrial Processes, "Industrial Processes," (1 page), available at http://freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Technical Overview "A System Overview," (1 page), available at http://www.freepower.co.uk/tech-overview.htm, 2000-2006, printed Jul. 26, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.

Freepower ORC Electricity Company Home Page, "Welcome to Freepower," (1 page) available at http://www.freepower.co.uk/, Jul. 18, 2006.

PureCycle: Overview, "Super-efficient, reliable, clean energy-saving alternatives—the future is here," (1 page) available at http://www.utepower.com/fs/com/bin/fs_com_Page/0,5433,03400,00.html, printed Jul. 26, 2006.

Ormat Web Site: "Recovered Energy Generation in the Cement Industry," (2 pages) available at http://www.ormat.com/tecgnology_cement_2.htm, printed Jul. 26, 2006.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

International Search Report and Written Opinion of the International Searching Authority issued in International Application No. PCT/US2009/031837 on Sep. 7, 2009; 11 pages.

International Preliminary Report on Patentability issued in International Application No. PCT/US2009/031837 on Jul. 27, 2010, 6 pages.

International Search Report and Written Opinion of the International Searching Authority issued in International Application No. PCT/US2009/058816, mailed Jun. 10, 2010, 10 pages.

International Preliminary Report on Patentability issued in International Application No. PCT/US2009/058816 on Apr. 12, 2011, 5 pages.

Meeks, Crawford, "*Development of a Compact, Lightweight Magnetic Bearing*," 26th Annual AIAA/SAE/Asme/ASEE Joint Propulsion Conference, Jul. 16-18, 1990, 9 pages.

Office Action issued in U.S. Appl. No. 12/267,517, filed Mar. 28, 2011, 9 pages.

Office Action issued in U.S. Appl. No. 12/569,559, filed Apr. 25, 2011, 22 pages.

Notice of Allowance issued in U.S. Appl. No. 12/569,559, filed Aug. 9, 2011, 9 pages.

Notice of Allowance issued in U.S. Appl. No. 12/358,172, filed Sep. 20, 2011, 10 pages.

Notice of Allowance issued in U.S. Appl. No. 12/569,559, filed Jan. 27, 2012, 6 pages.

Request for Continued Examination filed in U.S. Appl. No. 12/569,559, filed Nov. 9, 2011, 13 pages.

Notice of Allowance issued in U.S. Appl. No. 12/267,517, filed Feb. 21, 2012, 7 pages.

Amendment filed in U.S. Appl. No. 12/267,517, filed Jan. 31, 2012, 9 pages.

GENERATING ELECTROMAGNETIC FORCES IN LARGE AIR GAPS

TECHNICAL FIELD

This disclosure relates to generating electromagnetic forces and supporting a body, at least in part, by a magnetic field.

BACKGROUND

Equipment and machinery often contain moving (e.g., rotating) members, which require support during operation. A bearing, or similar device, may be used to support the moving member. Although many types of bearings require direct contact with the member to provide the necessary support, some applications benefit from non-contact, or nearly non-contact support for the member. A magnetic bearing uses a magnetic field to apply force to, and thereby support, the moving member in a non-contact, or nearly non-contact, manner. The non-contact or nearly non-contact support provided by the magnetic bearing can provide frictionless or nearly frictionless movement of the member. In such magnetic bearings, the clearance between the stationary and moving parts can have an effect on the magnitude of the supporting force established by the magnetic field.

SUMMARY

An electromagnetic actuator includes an actuator target with a rotational axis. A target magnetic element is arranged circumferentially around the rotational axis and has inner and outer magnetic poles. The inner magnetic pole of the target magnetic element can be located closer to the rotational axis than the outer magnetic pole. A cylindrical soft-magnetic target pole piece can be magnetically coupled to the outer cylindrical magnetic pole of the target magnetic element. An actuator base includes a plurality of radial poles arranged circumferentially around and radially spaced apart from the cylindrical soft-magnetic target pole piece. The plurality of radial poles and the cylindrical soft-magnetic target pole piece may define radial gaps therebetween. A plurality of control coils may be around the plurality of radial poles. The plurality of radial poles and the cylindrical soft-magnetic target pole may be magnetically coupled and define a plurality of magnetic control circuits. The plurality of control coils may be configured to produce control magnetic fluxes in the plurality of magnetic control circuits. The target magnetic element, the cylindrical soft-magnetic target pole, and the plurality of radial poles may be magnetically coupled and define a magnetic bias circuit. The target magnetic element may be configured to produce bias magnetic flux in the magnetic bias circuit.

The electromagnetic actuator may further include a target bias magnetic flux return element magnetically coupled to the inner magnetic pole of the target magnetic element. The target bias magnetic flux return element may further define the magnetic bias circuit. The target bias magnetic flux return element of the electromagnetic actuator may also include a soft-magnetic structure. The target magnetic element of the electromagnetic actuator may be a first target magnetic element and the cylindrical soft-magnetic target pole piece may be a first cylindrical soft-magnetic target pole piece. A second target magnetic element may have inner and outer cylindrical magnetic poles arranged circumferentially around the rotational axis, the inner magnetic pole of the second target magnetic element may be located closer to the rotational axis than the outer magnetic pole of the second target magnetic element and the polarities of the inner and outer magnetic poles of the second target magnetic element may be opposite to polarities of the inner and outer magnetic poles of the first target magnetic element. A second cylindrical soft-magnetic target pole may be proximate the outer cylindrical magnetic pole of the second target magnetic element. A third target magnetic element may be located axially between the first and the second target magnetic elements and having a first disk-shaped magnetic pole and a second disk-shaped magnetic pole arranged circumferentially around the rotational axis. The first disk-shaped pole may be adjacent the first target magnetic element and may have the same polarity as the outer cylindrical pole of the first target magnetic element. The second disk-shaped pole may be adjacent the second target magnetic element and may have the same polarity as the outer cylindrical pole of the second target magnetic element.

The actuator base may include a base bias magnetic flux return element magnetically coupled to the plurality of radial poles and further defining the magnetic bias circuit. The base bias magnetic flux return element may include a stationary soft-magnetic cylindrical pole.

The electromagnetic actuator may also include a base magnetic element having a first pole and a second pole, the first pole may be magnetically coupled to the plurality of radial poles and may have a polarity opposite to a polarity of the outer pole of the target magnetic element. The second pole may be magnetically coupled to the base bias magnetic flux return element.

Alternatively, the electromagnetic actuator may include a soft-magnetic spacer installed between and magnetically coupled to the plurality of the radial poles and the base bias magnetic flux return element.

The plurality of radial poles may be a first plurality of radial poles, the plurality of control coils may be a first plurality of control coils, and the plurality of magnetic control circuits may be a first plurality of magnetic control circuits. The base bias magnetic flux return element may further include a second plurality of radial poles arranged circumferentially around and radially spaced apart from the second cylindrical soft-magnetic target pole piece, the second plurality of radial poles and the second cylindrical soft-magnetic target pole piece may define radial gaps therebetween. A second plurality of control coils may be around the second plurality of radial poles. The second plurality of radial poles and the second cylindrical soft-magnetic target pole piece may be magnetically coupled and define a second plurality of magnetic control circuits, the second plurality of control coils may be configured to produce control magnetic fluxes in the second plurality of magnetic control circuits.

A method for exerting a radial force on a body, where the body may be configured to rotate about a rotational axis, includes generating a bias magnetic flux using a target magnetic element mounted on the body circumferentially around the rotational axis and having inner and outer magnetic poles, the inner magnetic pole located closer to the rotational axis than the outer magnetic pole. The method further includes communicating the bias magnetic flux between a first radial pole assembly, the body, and a second radial pole assembly. The first and second radial pole assemblies may be magnetically coupled and spaced apart from one another along the rotational axis. The first and second radial pole assemblies may each be circumferentially arranged around the rotational axis. The first and second radial pole assemblies may be separated from the body by an air gap. The bias magnetic flux may propagate through the body in a direction parallel to the rotational axis. The bias magnetic flux generated by the target magnetic element may further be the first bias magnetic flux, and there may be a second bias magnetic flux generated by a base magnetic element added to the first bias magnetic flux. The base magnetic element may be located between the first and the second radial pole assemblies. The method may further include communicating a radial control magnetic flux between the first radial pole assembly and a first body pole coupled to the body, the first radial control magnetic flux may propagate between a first radial pole of the first pole assembly, the body pole, and a second pole of the first radial pole assembly. The first radial control magnetic flux may propagate in a radial direction orthogonal to the rotational axis. The method also may include communicating a second radial control magnetic flux between the second radial pole assembly and a second body pole coupled to the body and spaced apart from the first body pole along the rotational axis. The second radial control magnetic flux may propagate between a first radial pole of the second pole assembly, the second body pole, and a second pole of the second pole assembly. The second radial control magnetic flux may propagate in a radial direction orthogonal to the rotational axis opposite from the first radial control magnetic flux. The net magnetic flux, which is a superposition of the bias and control magnetic fluxes, may exert an electromagnetic force on the actuator target. Generating the first and the second radial control magnetic fluxes may include energizing a control coil around each of the first and second radial poles of the first and second radial pole assemblies with a control current. The method may further include varying the control current to affect a total magnetic flux in the air gaps between the first and second radial pole assemblies and the body.

An electric machine system includes a rotor and a stator; the rotor having a rotational axis configured to move relative to the stator. An electromagnetic actuator sub-assembly includes an actuator target coupled to the rotor and an actuator base coupled to the stator. The actuator target includes a target magnetic element arranged circumferentially around the rotational axis and having inner and outer magnetic poles. The inner magnetic pole may be located closer to the rotational axis than the outer magnetic pole. A cylindrical, soft-magnetic target pole piece may be magnetically coupled to the outer cylindrical magnetic pole of the target magnetic element. An actuator base includes a plurality of radial poles arranged circumferentially around and radially spaced apart from the cylindrical soft-magnetic target pole piece. The plurality of radial poles and the cylindrical soft-magnetic target pole piece may define radial gaps therebetween. A plurality of control coils may be around the plurality of radial poles. The plurality of radial poles and the cylindrical soft-magnetic target pole may be magnetically coupled and define a plurality of magnetic control circuits. The plurality of control coils may be configured to produce control magnetic fluxes in the plurality of magnetic control circuits. The target magnetic element, the cylindrical soft-magnetic target pole, and the plurality of radial poles may be magnetically coupled and define a magnetic bias circuit, the target magnetic element may be configured to produce bias magnetic flux in the magnetic bias circuit. The system further may include at least one control electronics package configured to control the magnetic flux in the plurality of magnetic control circuits by controlling currents in the control coils. The net magnetic flux, which is a superposition of the bias and control magnetic fluxes, may exert an electromagnetic force on the actuator target. The system may further include one or more position sensors configured to sense a position of the rotor and the control electronic package may energize the control coils around each of the plurality of radial poles with control currents in response to changes of signals from the position sensors so that the rotor is supported by electromagnetic forces without a mechanical contact with the stator. The rotor of the electric machine system may be coupled to a driven load where the driven load may include at least one of a flywheel, a compressor, a generator, or an expander. Alternatively, the rotor of the electric machine system may be coupled to a driver, the driver including at least one of a motor, an engine, or a turbine. The system may further include a can separating the body from the base configured to prevent access of a working fluid to at least the control coils.

DETAILED DESCRIPTION

Some applications of magnetic bearings involve large clearances between the stationary and moving parts of the bearings. Large clearances may arise in applications where the moving part is submerged in some sort of a liquid or a gas that should be isolated from the stationary part of a machine by means of a hermetically sealed can. The thickness of this can may add to the clearance between the stationary and moving parts of the magnetic bearing and, thus, may significantly increase it. Alternatively, it may not be required to isolate stationary parts of the motor/generator and magnetic bearings from processing gases or fluids, but large clearances between the stationary and rotating parts may be needed if large particles are present in the processing gases or fluids which may cause a machine seizure if stuck in small clearances. Increasing clearances between the stationary and rotating parts of the bearing may result in increasing magnetic reluctance of the air gap defined by the clearance. The increasing reluctance, in turn, decreases the total magnetic flux communicated between the stationary and rotating members, which results in a decrease of the magnitude of the supporting force.

Figure 1A:
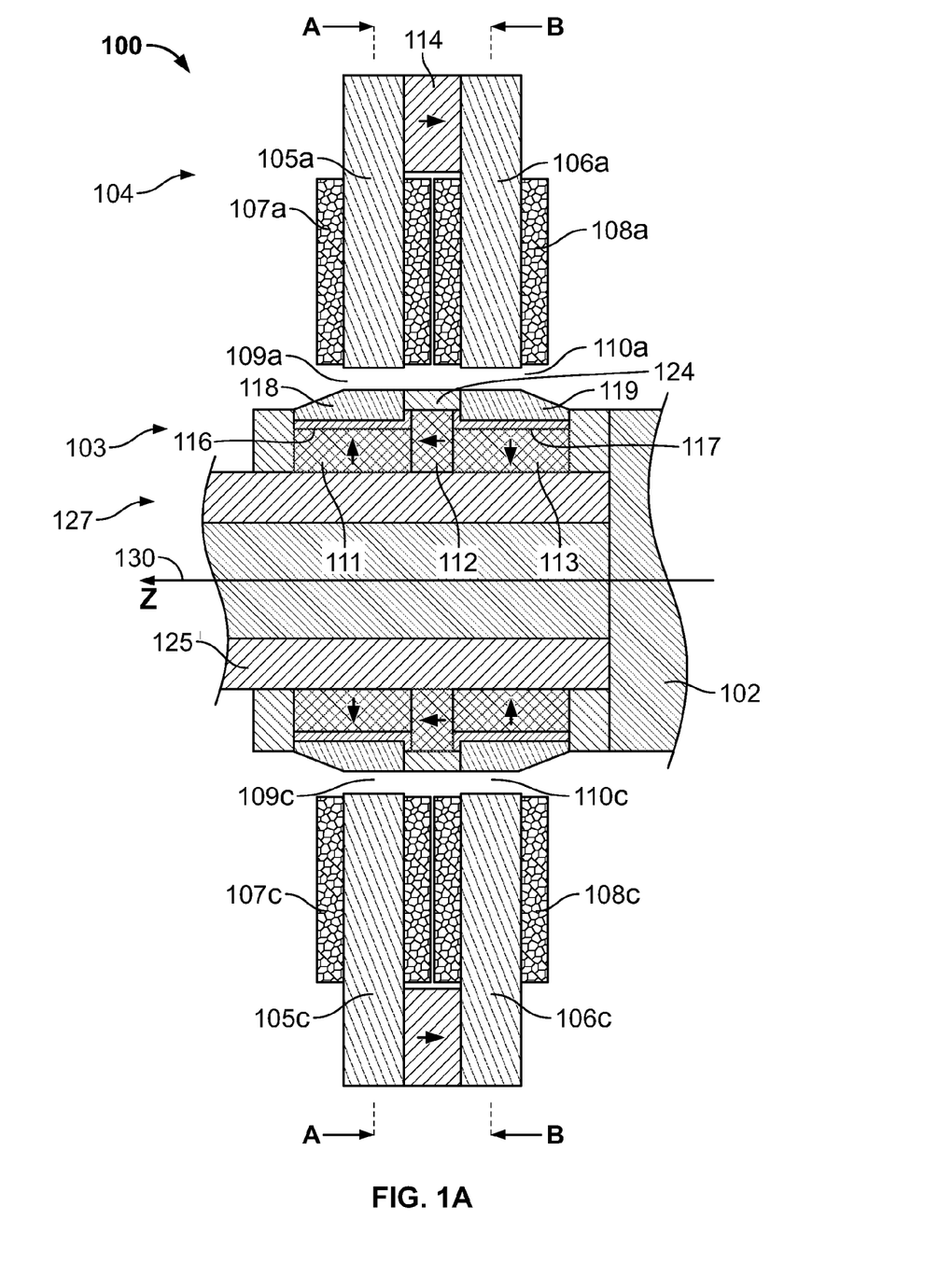
FIG. 1A is a side cross-sectional view of an embodiment of a homopolar actuator for generating electromagnetic forces in large air gaps.
Figure 1B:
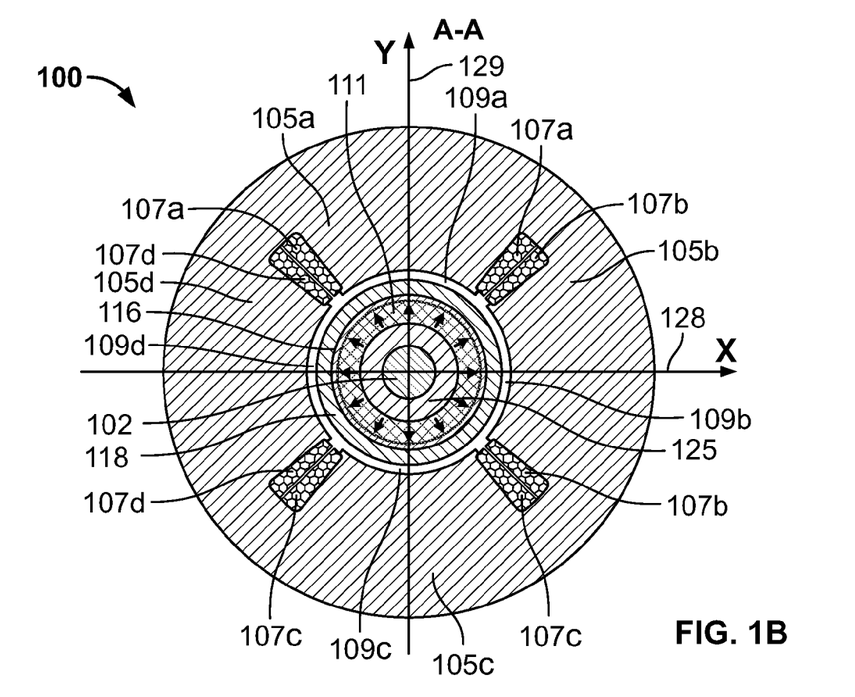
FIGS. 1B-C are axial cross-sectional views of the homopolar actuator of FIG. 1A.
Figure 1C:
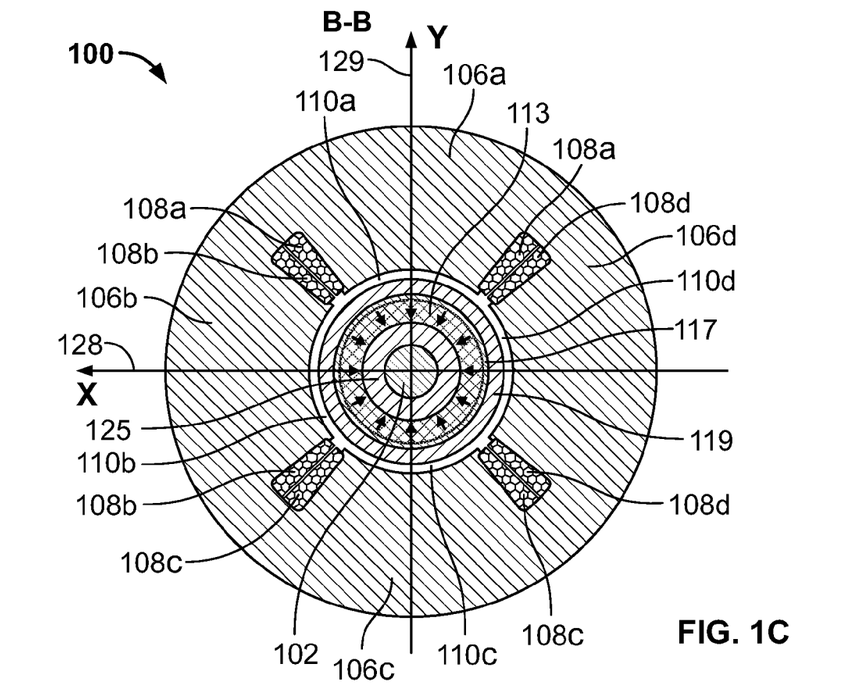

FIG. 1A is a side cross-sectional schematic of an embodiment of the magnetic actuator of the present disclosure. The magnetic actuator 100 shown in FIG. 1A can produce controllable forces on an object 102 in the radial plane defined by X axis 128 and Y axis 129 (as shown in FIGS. 1B-C). The magnetic interaction takes place between the actuator target 127 (defined by the object 102 and movable magnetic circuit components 103 firmly affixed to the object 102) and the stationary magnetic circuit components. The stationary magnetic circuit components may be referred to collectively as the stationary assembly 104. As described further below, the movable magnetic circuit components 103 and the stationary assembly 104 define a magnetic circuit. In FIG. 1A, the actuator target 127 is shown to have a rotational symmetry about the axis Z 130; this, however, is not necessary.

The stationary assembly 104 includes two sets of radial poles 105a-d (shown in FIG. 1B) and 106a-d (shown in FIG. 1C) situated around the actuator target 127. Radial poles 105a-d and 106a-d may be made of a soft-magnetic material, in particular they may be assembled of soft-magnetic conductive laminations stacked axially and electrically isolated from each other. Each of the radial poles 105a-d and 106a-d has one of the control coils 107a-d or 108a-d around it. For example, radial pole 105a has control coil 107a around it; and radial pole 106a has control coil 108a around it. The radial stationary poles within each group 105a-d and 106a-d are magnetically linked to each other. The movable magnetic circuit components 103 may include radially magnetized magnets 111 and 113, axially magnetized magnet 112, soft-magnetic sleeves 116 and 117, soft-magnetic target poles 118 and 119 and soft-magnetic target backiron 125. If the object 102 is soft-magnetic, the soft-magnetic target backiron 125 may not be necessary. Target poles 118 and 119 may be made of a soft-magnetic material; in particular, they may be assembled of soft-magnetic conductive laminations stacked axially and electrically isolated from each other. Further, the target poles 118 and 119 may have a chamfered surface, which may focus the magnetic flux radially into the poles. The radial poles 105a-d have surfaces adjacent to the surface of the target poles 118, and separated from it by radial air gaps 109a-d. Similarly, the radial magnetic stationary poles 106a-d have surfaces adjacent to the surface of the soft magnetic target poles 119, and separated from it by radial air gaps 110a-d. In some implementations, a fewer or greater number of radial magnetic stationary poles 105a-d and 106a-d may be utilized.

Sleeves 116 and 117 are between the target poles 118 and 119 and the magnets 111 and 113, respectively. The sleeves 116 and 117 help to compress the magnets to protect them from breaking during high rotational speeds. The sleeves 116 and 117 may be steel tubes sized in such a way that the magnets remain at compression during high rotational speeds. For example, they may be steel tubes applied at high temperatures around the magnets 111 and 113, and then allowed to cool. Sleeves 116 and 117 may be, for example, magnetic steel tubes to conduct magnetic flux between the magnets 111 and 113 and the air gaps 109a-d and 110a-d, respectively. The pole areas of the magnets 111 and 113 can be made larger than the net area of all the surfaces of the stator radial magnetic poles 105a-d or 106a-d facing the gaps 109a-d or 110a-d by extending the magnets 111 and 113 axially without sacrificing the cross-section of the object 102. Sleeve 124 supports magnet 112 such that magnet 112 remains at compression at high rotational speeds. Sleeve 124 may be non-magnetic material such as stainless steel or may be brass, Inconel®, or any strong non-magnetic material known in the art.

Figure 2A:
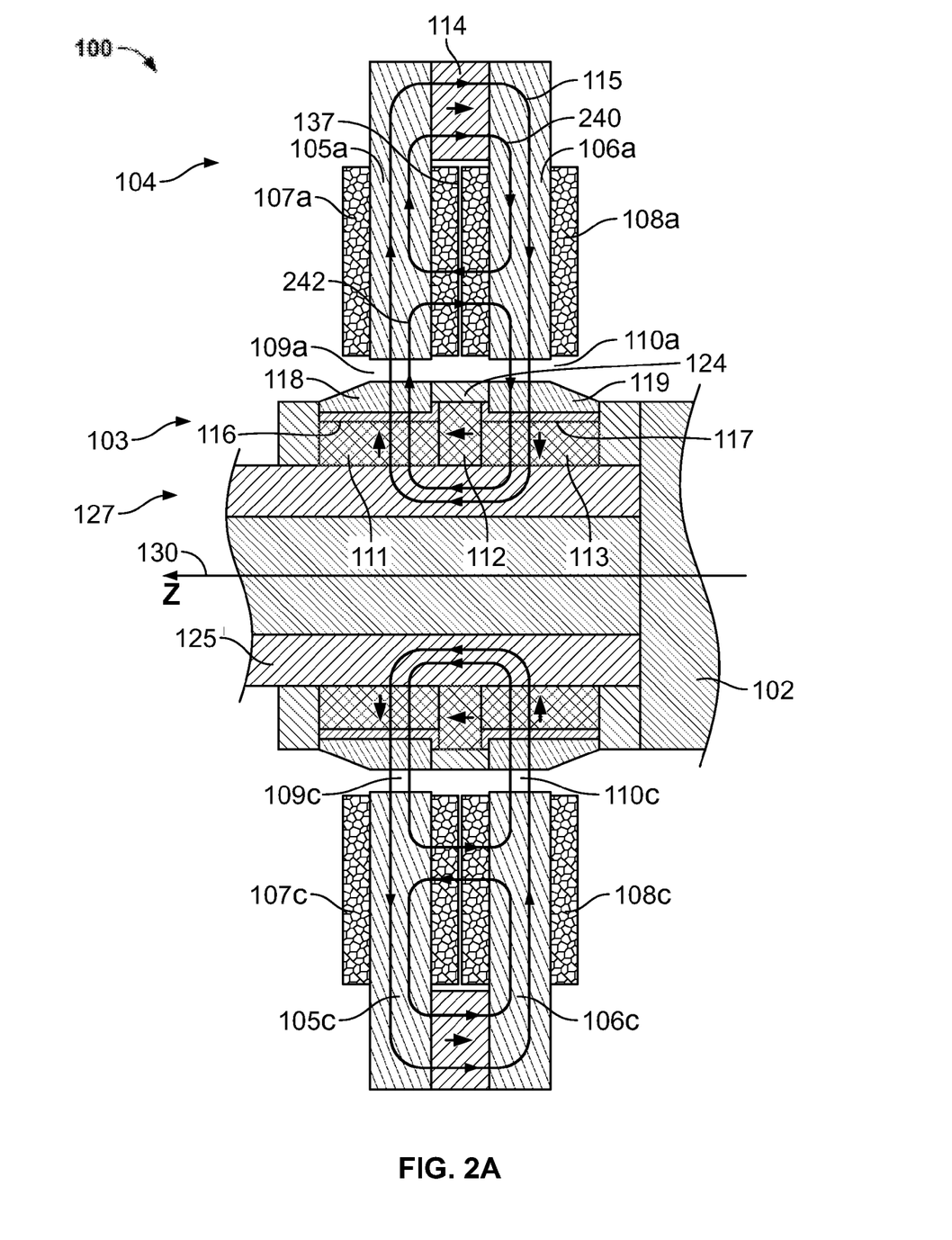
FIG. 2A is a side cross-sectional view illustrating the operational principles of the embodiment of the homopolar actuator of FIG. 1A-C.
Figure 2B:
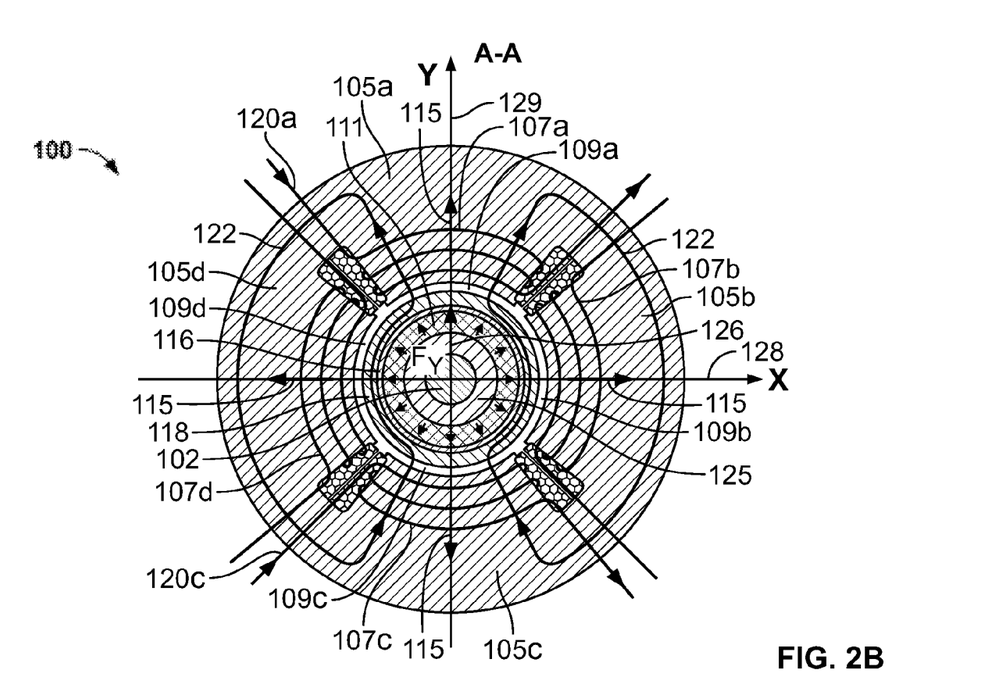
FIGS. 2B-C are axial cross-sectional views of FIG. 2A illustrating the operational principles of the embodiment of the homopolar actuator of FIG. 1A-C.
Figure 2C:
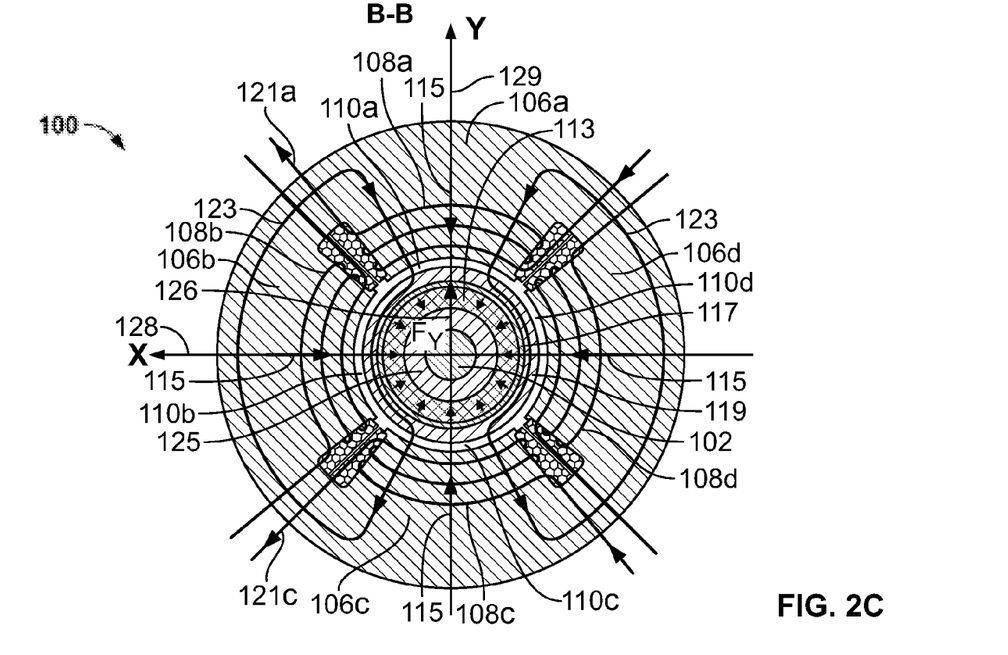

FIG. 2 explains the operational principle of the device 100. The radial poles 105a-105d, 106a-106d, the target poles 118 and 119, radially magnetized magnets 111 and 113, axially magnetized magnet 112, stationary permanent magnet 114, and the soft-magnetic sleeves 116 and 117 form a magnetic bias circuit. Permanent magnets 111-113 within the moveable portion of the magnetic circuit 103 and the stationary permanent magnet 114 within the stationary portion of the magnetic circuit (i.e., within the stationary assembly 104) generate bias magnetic flux 115. Beginning hypothetically at magnet 114, bias flux 115 propagates from the magnet 114 radially through the radial poles 106a-d, across the air gaps 110a-d, into the target pole 119, and into the backiron 125. The bias flux 115 then propagates axially, e.g., in the positive Z direction in FIG. 2A, and is then directed radially through target pole 118, across the air gaps 109a-d, and radially through the radial poles 105a-105d and back to magnet 114. The bias flux 115 flows radially within each set of the radial control poles 105a-d and 106a-d: outward in the poles 105a-d and inward in the poles 106a-d. Because the polarity of the bias fluxes within each set of the radial magnetic stationary poles 105a-d or 106a-d is the same, the proposed electromagnetic actuator can be classified as homopolar. Using two sets of magnets mounted on both the stationary part of the magnetic circuit (magnet 114 of stationary assembly 104) and the moveable part of the magnetic circuit (magnets 111-113 of the movable magnetic circuit components 103) may result in a smaller magnetic flux leakage between two sets of radial magnetic stationary poles 105a-d and 106a-d than if magnets were only installed on the stationary part of the magnetic circuit. Minimizing the magnetic flux leakage between two sets of radial magnetic stationary poles 105a-d and 106a-d increases the useful flux that can be accommodated in these poles before magnetic saturation is reached, resulting in a higher load capacity of the bearing. Two sets of magnets as such may also result in a smaller amount of magnetic material on the moveable portion of the magnetic circuit than if magnets were installed only on the moveable part of the magnetic circuit. Minimizing the amount of the magnetic material on the moveable portion of the magnetic circuit is beneficial in applications where the moveable portion of the magnetic circuit is subjected to high stresses because of a low mechanical strength of the magnetic materials. An example of such application is when the object 102 spins about the Z axis 130 and the stresses in the moveable portion of the magnetic circuit are caused by centrifugal forces. Using radially magnetized magnets 111 and 113 in the moveable portion of the magnetic circuit 103 allows one to obtain the desired bias flux 115 in the air gaps 109a-d and 110a-d even when these gaps are very large by making these magnets sufficiently long axially without having to make the cross-section of the object 102 under these magnets unacceptably small. Keeping this cross-section sufficiently large is critical in applications where the strength and the rigidity of the actuator target are of high importance, particularly in applications where the actuator target 127 spins about the Z axis 130, because most of the strength and the rigidity may come from the object 102 whereas magnets 111-113 typically are the mechanically weakest components. The soft-magnetic poles 118 and 119 serve to collect the fluxes from the entire axial spans of the magnets 111 and 113 and direct them to the air gaps 109a-d and 110a-d. This allows obtaining high bias flux densities in the in the air gaps 109a-d and 110a-d even when these gaps are very large. Tapered shapes of the soft-magnetic poles 118 and 119 further increase bias flux densities in the air gaps 109a-d and 110a-d by reducing magnetic flux leakages between the poles 118, 119 and the outwards faces of the radial magnetic stationary poles 105a-d and 106a-d. The axially magnetized magnet 112 reduces internal magnetic flux leakage inside the moveable magnetic circuit portion 103 resulting in higher bias magnetic flux densities in the radial air gaps 109a-d and 110a-d and may not be necessary. It also may be substituted for a non-magnetic material, such as stainless steel, or may be brass, Inconel®, or any strong non-magnetic material known in the art. A non-magnetic sleeve 124 on top of the magnet 112 keeps the magnet 112 in compression, thus preventing it from breaking apart under the influence of centrifugal forces.

When the object 102 is centrally positioned and there are no currents in the radial control windings 107a-d or 108a-d, the bias flux densities under each pole 105a-d and 106a-d are equal because of the symmetrical nature of the system. Therefore, there is no radial force produced on the object 102. By energizing some of the radial control windings, 107a-d and 108a-d, the flux distribution may be altered so as to develop a radial force. For example, FIGS. 2B and 2C show windings 107a, 107c and 108a, 108c energized with control currents 120a, 120c and 121a, 121c respectively. These currents produce radial control fluxes 122 and 123. Note that the paths of the radial control fluxes 122 and 123 lie entirely in the soft-magnetic parts of the stationary portion of the magnetic circuit (i.e., of stationary assembly 104 and a movable magnetic circuit components 103). In particular, in the movable portion of the magnetic circuit 103 the radial control fluxes 122 and 123 travel within the soft-magnetic poles 118 and 119 and do not cross permanent magnets 111-113 which would otherwise significantly increase the reluctances of the magnetic paths due to their low permeability, and, consequently, would result in much larger currents 120a, 120c and 121a, 121c needed to produce the same radial control fluxes 122 and 123.

In the radial air gaps 109a and 110a control fluxes 122 and 123 add to the magnetic bias flux 115, whereas in the radial air gaps 109c and 110c, radial control fluxes 122 and 123 subtract from the magnetic bias fluxes 115. Due to the higher resulting net magnetic flux densities in the radial air gaps 109a and 110a compared to the radial air gaps 109c and 110c, radial electromagnetic force $F_Y$ 126 acts on the actuator target poles 118, 119 and, consequently, on the object 102. In FIG. 2 this force $F_Y$ 126 is directed upward.

Continuing with FIG. 2, the portion of the electromagnetic force $F_Y$ 126 exerted on either actuator target pole 118 or 119 by the upper poles 105a or 106a associated with winding 107a and 108a can be calculated as $$F_{rad1} = \frac{1}{2\mu_0}(B0_{rad} + B1_{rad})^2 \cdot A_{rad},$$

where $B0_{rad}$ is the density of the bias flux 115 in radial gaps 109a or 110a, $B1_{rad}$ is the density of the radial control fluxes 122 or 123 in the radial gap 109a or 110a associated with windings 107a or 108a, and $A_{rad}$ is the projection of the pole surface adjacent to the radial air gap 109a or 110a on a plane normal to the pole axis (Y axis as illustrated in FIG. 2).

Similarly, the electromagnetic force exerted on either actuator target pole 118 or 119 by the lower poles 105c or 106c associated with windings 107c and 108c can be calculated as:

$$F_{rad2} = \frac{1}{2\mu_0}(B0_{rad} + B1_{rad})^2 \cdot A_{rad}.$$

The net radial force on either actuator target pole 118 or 119 will then be:

$$F_{rad} = F_{rad1} - F_{rad2} =$$

$$\frac{A_{rad}}{2\mu_0}\{(B0_{rad} + B1_{rad})^2 - (B0_{rad} - B1_{rad})^2\} = 2\frac{A_{rad}}{\mu_0}B0_{rad}B1_{rad}$$

If radial control currents 120a and 120c (121a and 121c) are equal to a radial control current $I_{rad}$, the radial control magnetic flux density $B1_{rad}$ will be proportional to the radial control current $I_{rad}$, and consequently, the radial force $F_{rad}$ will be proportional to $I_{rad}$. Although illustrated and described above in the Y direction, the same features apply in the X direction. Therefore, this implementation allows the electromagnetic actuator 100 to produce bidirectional electromagnetic forces along two radial axes, designated in FIG. 2 as X 128 and Y 129.

The soft-magnetic poles 118 and 119 can be composed of electrical steel laminations electrically isolated from each other and stacked together in the axial direction in order to minimize eddy currents that can be induced if the object 102 rotates about its axis Z 130. The soft-magnetic sleeves 116 and 117 may provide additional structural integrity if the soft-magnetic poles 118 and 119 are composed of electrical steel laminations.

Figure 3A:
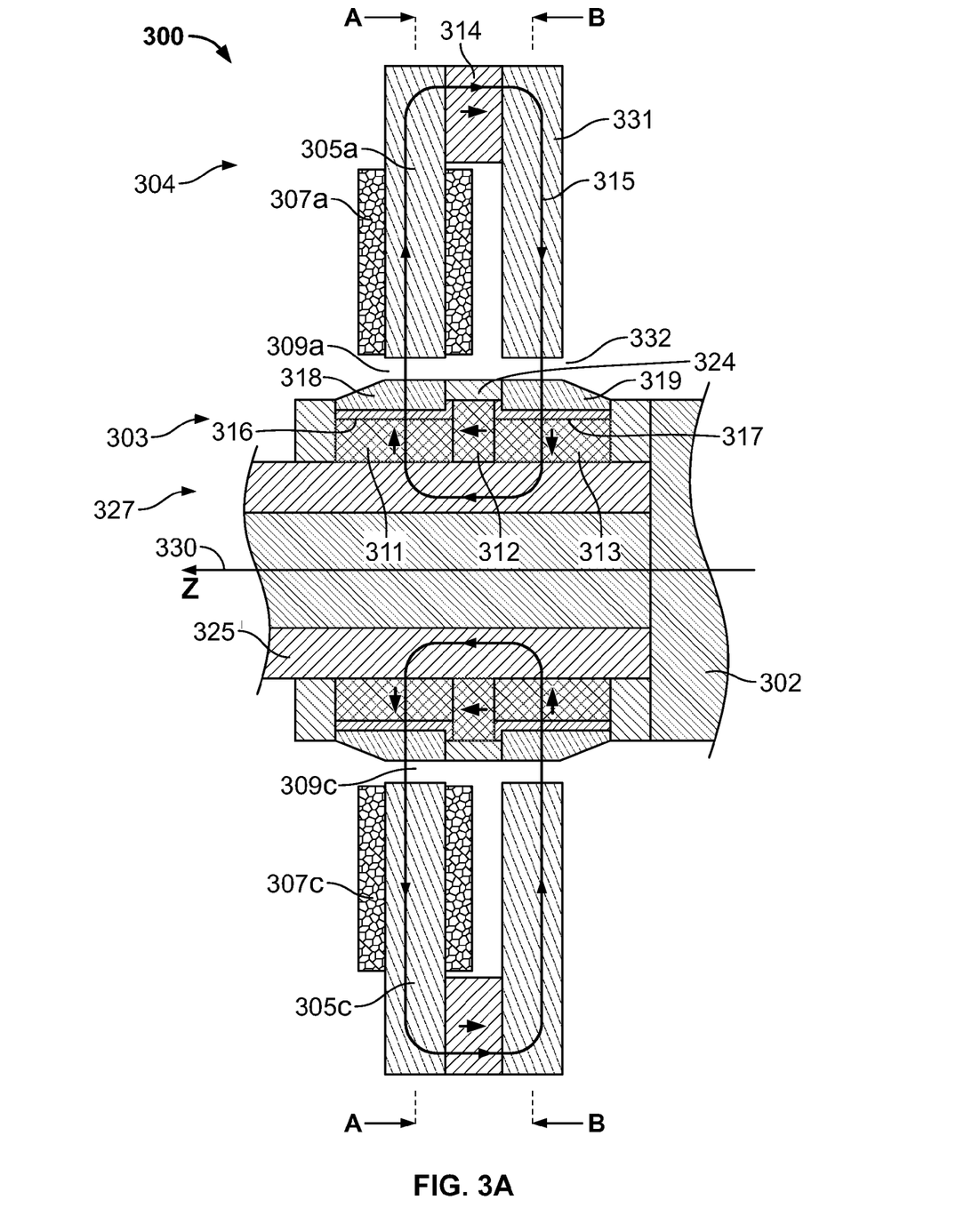
FIG. 3A is a side cross-sectional view of an embodiment of a homopolar actuator incorporating a continuous flux return pole.
Figure 3B:
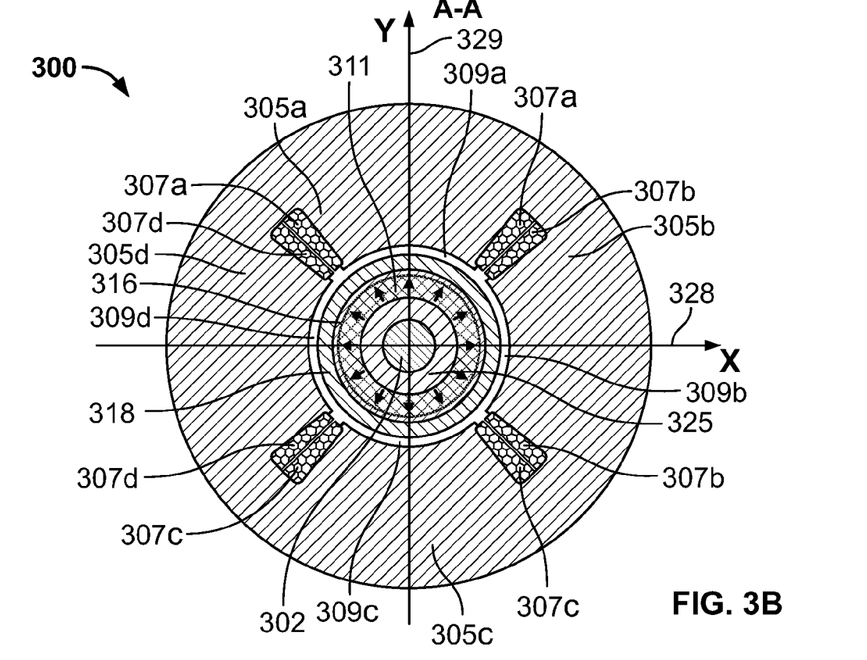
FIGS. 3B-C are axial cross-sectional views of the homopolar actuator of FIG. 3A.
Figure 3C:
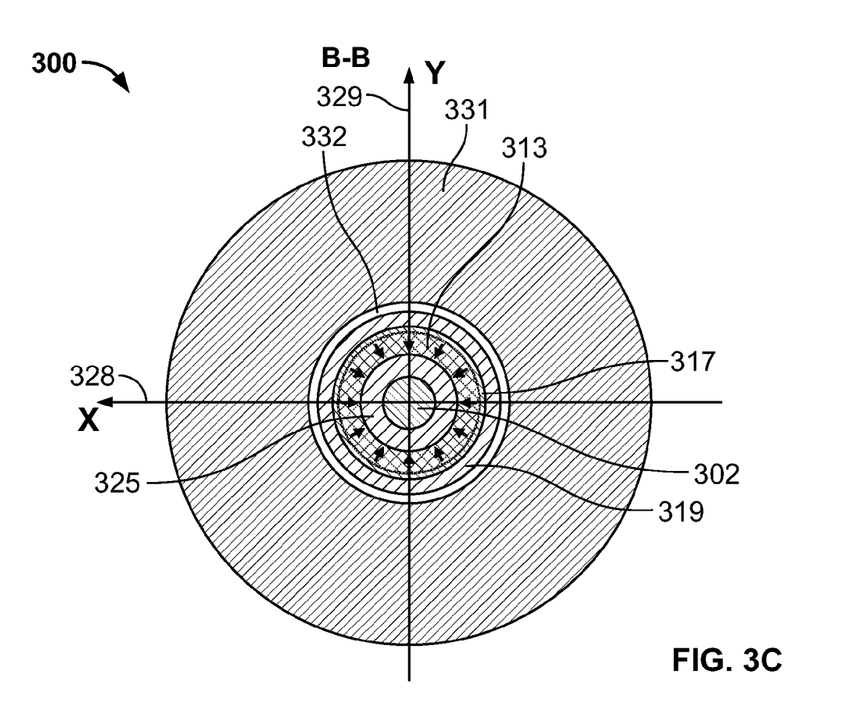

FIGS. 3A-C illustrate another embodiment of the actuator of the present disclosure. The difference from FIG. 1 is that the second set of radial magnetic stationary poles 106a-106d is replaced with a single continuous stator flux return pole 331 separated from the actuator target pole 319 by a continuous air gap 332. The stator flux return pole 331 may not produce a controllable force on the actuator target pole 319, but provides a return path for the bias flux 315.

FIG. 3A is a side cross-sectional schematic of an embodiment of the magnetic actuator of the present disclosure. The magnetic actuator 300 shown in FIG. 3 can produce controllable forces on an object 302 in the radial plane defined by X axis 328 and Y axis 329 (as shown in FIGS. 3B-C). The magnetic interaction takes place between the actuator target 327, defined by the object 302 and movable magnetic circuit components 303 firmly affixed to the object 302, and a stationary magnetic circuit components. The stationary magnetic circuit components may be referred to collectively as the stationary assembly 304. As described further below, the movable magnetic circuit components 303 and the stationary assembly 304 define a magnetic circuit. In FIG. 3A, the actuator target 327 is shown to have a rotational symmetry about the axis Z 330; this, however, is not necessary.

The stationary assembly 304 includes radial poles 305a-d (shown in FIG. 3B) and a continuous stator flux return pole 331 (shown in FIG. 3C) situated around the actuator target 327. Radial poles 305a-d and stator flux return pole 331 may be made of a soft-magnetic material, in particular they may be assembled of soft-magnetic conductive laminations stacked axially and electrically isolated from each other. Each of the radial poles 305a-d has one of the control coils 307a-d around it. For example, radial pole 305a has control coil 307a around it. The radial stationary poles 305a-d are magnetically linked to each other. The movable magnetic circuit components 303 may include radially magnetized magnets 311 and 313, axially magnetized magnet 312, soft-magnetic sleeves 316 and 317, soft-magnetic target poles 318 and 319 and soft-magnetic target backiron 325. If the object 302 is soft-magnetic, the soft-magnetic target backiron 325 may not be necessary. Target poles 318 and 319 may be made of a soft-magnetic material; in particular, they may be assembled of soft-magnetic conductive laminations stacked axially and electrically isolated from each other. Further, the target poles 318 and 319 may have a chamfered surface, which may focus the direction of the magnetic flux radially into the poles. The radial poles 305a-d have surfaces adjacent to the surface of the target poles 318, and separated from it by radial air gaps 309a-d. Similarly, the radial magnetic stationary pole 331 has a surface adjacent to the surface of the soft magnetic target poles 319, and separated from it by radial air gaps 332. In some implementations, a fewer or greater number of radial magnetic stationary poles 305a-d may be utilized.

Sleeves 316 and 317 are between the target poles 318 and 319 and the magnets 311 and 313, respectively. The sleeves 316 and 317 help to compress the magnets to protect them from breaking during high rotational speeds. The sleeves 316 and 317 may be steel tubes sized in such a way that the magnets remain at compression during high rotational speeds. For example, they may be steel tubes applied at high temperatures around the magnets 311 and 313, and then allowed to cool. Sleeves 316 and 317 may be, for example, magnetic steel tubes to conduct magnetic flux between the magnets 311 and 313 and the air-gaps 309a-d and 332, respectively. Sleeve 324 supports magnet 312 such that magnet 312 remains at compression at high rotational speeds. Sleeve 324 may be non-magnetic material such as stainless steel or may be brass, Inconel®, or any strong non-magnetic material known in the art.

As illustrated in FIGS. 3A-C, the radial poles 305a-305d and 331, the target poles 318 and 319, magnets 311-314, and the soft-magnetic sleeves 316 and 317 form a magnetic bias circuit. Magnets 311-314 produce bias magnetic flux 315 in the bias magnetic circuit. In the embodiment of FIG. 3A, beginning hypothetically at magnet 314, bias flux 315 propagates from the magnet 314 radially through the radial pole 331, across the air gap 332, into the target pole 319, and into the backiron 325. The bias flux 315 then propagates axially, e.g., in the positive Z direction in FIG. 3A, and is then directed radially through target pole 318, across the air gaps 309a-309d, and radially through the radial poles 305a-305d and back to magnet 314. The axially magnetized magnet 312 reduces internal magnetic flux leakage inside the moveable magnetic circuit portion 303 resulting in higher bias magnetic flux densities in the radial air gaps 309a-d and may not be necessary. It also may be substituted for a non-magnetic material, such as stainless steel, or may be brass, Inconel®, or any strong non-magnetic material known in the art.

Figure 4A:
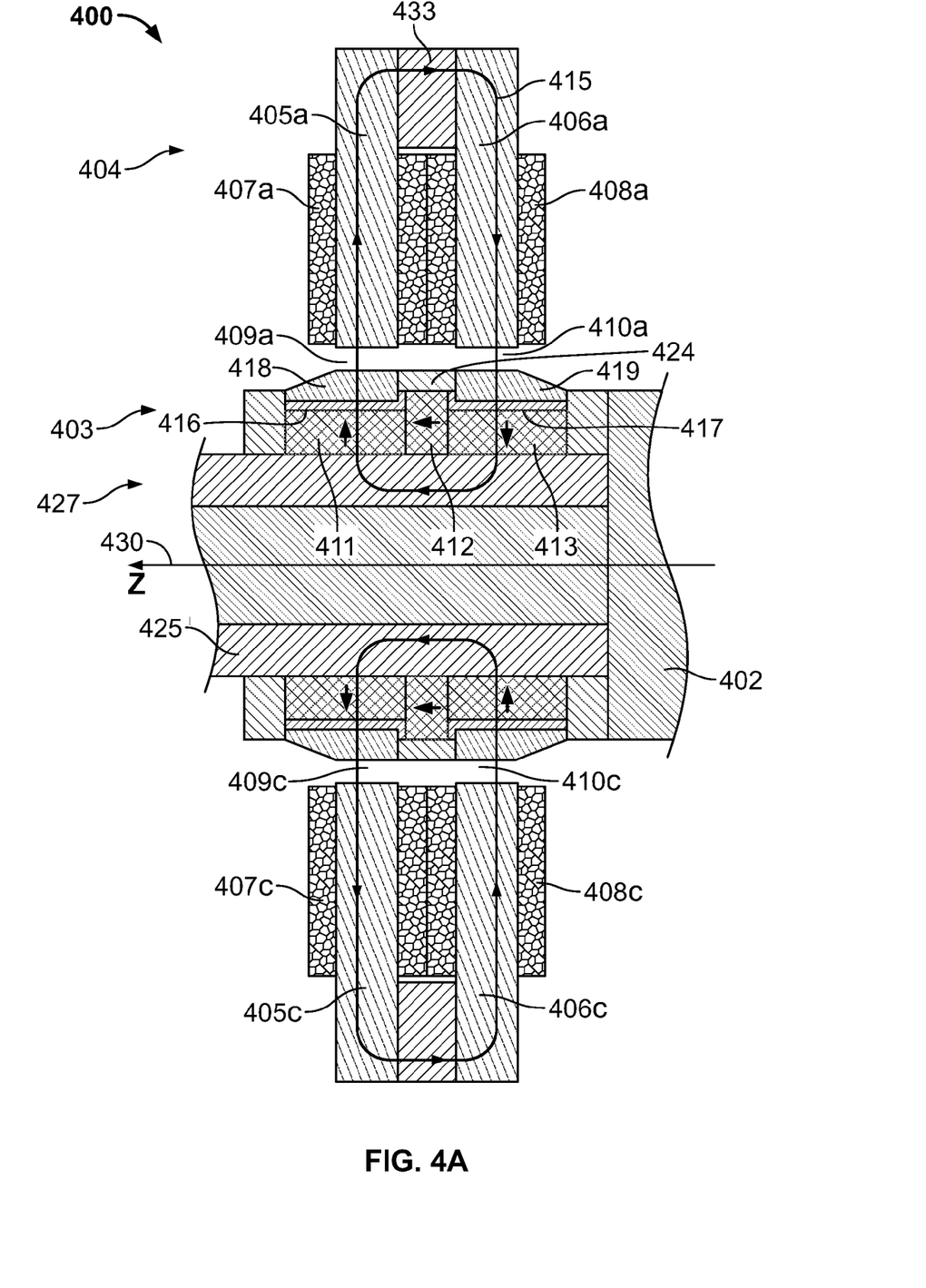
FIG. 4A is a side cross-sectional view of an embodiment of a homopolar actuator with the bias flux being generated by the magnets mounted on the rotor.

FIG. 4A illustrates an embodiment of the actuator of the present disclosure where the stationary portion of the actuator lacks a permanent magnet. FIG. 4A is a side cross-sectional schematic of an embodiment of the magnetic actuator replacing the permanent magnetic in the stationary portion 404 with a soft-magnetic spacer 433. The magnetic actuator 400 shown in FIG. 4A can produce controllable forces on an object 402 in the radial plane defined as the plane normal to the Z axis 430. The magnetic interaction takes place between the actuator target 427, defined by the object 402 and movable magnetic circuit components 403 firmly affixed to the object 402, and stationary magnetic circuit components. The stationary magnetic circuit components may be referred to collectively as the stationary assembly 404. As described further below, the movable magnetic circuit components 403 and the stationary assembly 404 define a magnetic circuit. In FIG. 4, the actuator target 427 is shown to have a rotational symmetry about the axis Z 430; this, however, is not necessary. In FIG. 4, the bias flux is generated only by magnets 411-413 mounted on the actuator target 427 whereas the magnet installed in the stationary portion of the magnetic circuit 404 of the apparatus in FIG. 4A is replaced with a soft-magnetic spacer 433.

The stationary assembly 404 includes two sets of radial poles 405a-d (shown in FIG. 4B) and 406a-d (shown in FIG. 4C) situated around the actuator target 427. Radial poles 405a-d and 406a-d may be made of a soft-magnetic material, in particular they may be assembled of soft-magnetic conductive laminations stacked axially and electrically isolated from each other. Each of the radial poles 405a-d and 406a-d has one of the control coils 407a-d or 408a-d around it. For example, radial pole 405a has control coil 407a around it; and radial pole 406a has control coil 408a around it. The radial stationary poles within each group 405a-d and 406a-d are magnetically linked to each other. The movable magnetic circuit components 403 may include radially magnetized magnets 411 and 413, axially magnetized magnet 412, soft-magnetic sleeves 416 and 417, soft-magnetic target poles 418 and 419 and soft-magnetic target backiron 425. If the object 402 is soft-magnetic, the soft-magnetic target backiron 425 may not be necessary. Target poles 418 and 419 may be made of a soft-magnetic material, in particular they may be assembled of soft-magnetic conductive laminations stacked axially and electrically isolated from each other. Further, the target poles 418 and 419 may have a chamfered surface, which may focus the direction of the magnetic flux radially into the poles. The radial poles 405a-d have surfaces adjacent to the surface of the target poles 418, and separated from it by radial air gaps 409a-d. Similarly, the radial magnetic stationary poles 406a-d have surfaces adjacent to the surface of the soft magnetic target poles 419, and separated from it by radial air gaps 410a-d. In some implementations, a fewer or greater number of radial magnetic stationary poles 405a-d and 406a-d may be utilized.

Sleeves 416 and 417 are adjacent the target poles 418 and 419 and the magnets 411 and 413, respectively. The sleeves 416 and 417 help to compress the magnets to protect them from breaking during high rotational speeds. The sleeves 416 and 417 may be steel tubes sized in such a way that the magnets remain at compression during high rotational speeds. For example, they may be steel tubes applied at high temperatures around the magnets 411 and 413, and then allowed to cool. Sleeves 416 and 417 may be, for example, magnetic steel tubes to conduct magnetic flux between the magnets 411 and 413 and the air gaps 409a-d and 410a-d, respectively. Sleeve 424 supports magnet 412 such that magnet 412 remains at compression at high rotational speeds. Sleeve 424 may be a non-magnetic material, such as a stainless steel, brass, Inconel®, or any strong non-magnetic material known in the art.

Figure 4B:
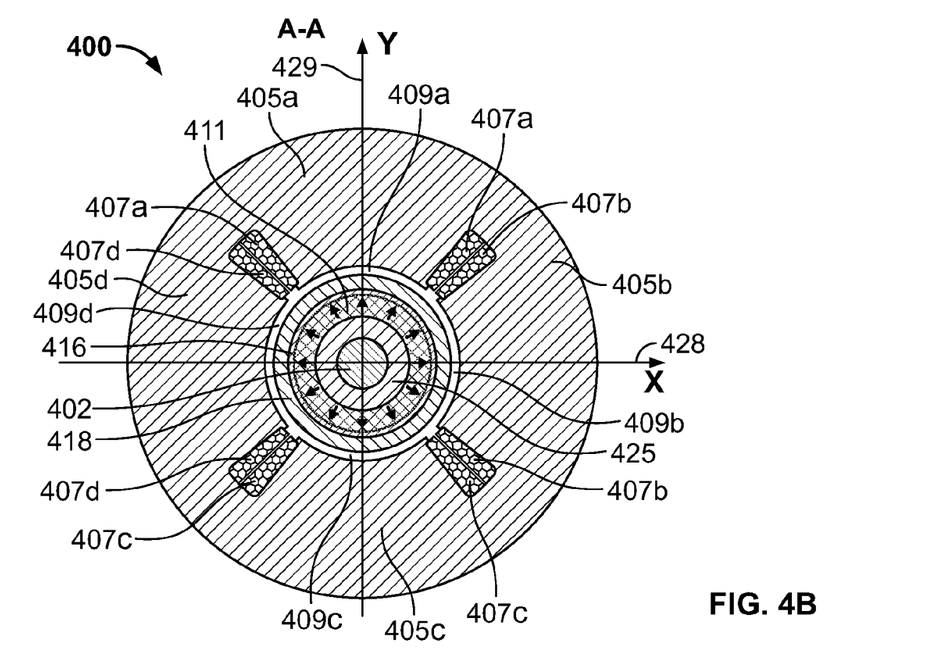
FIGS. 4B-C are axial cross-sectional views of the homopolar actuator of FIG. 4A.
Figure 4C:
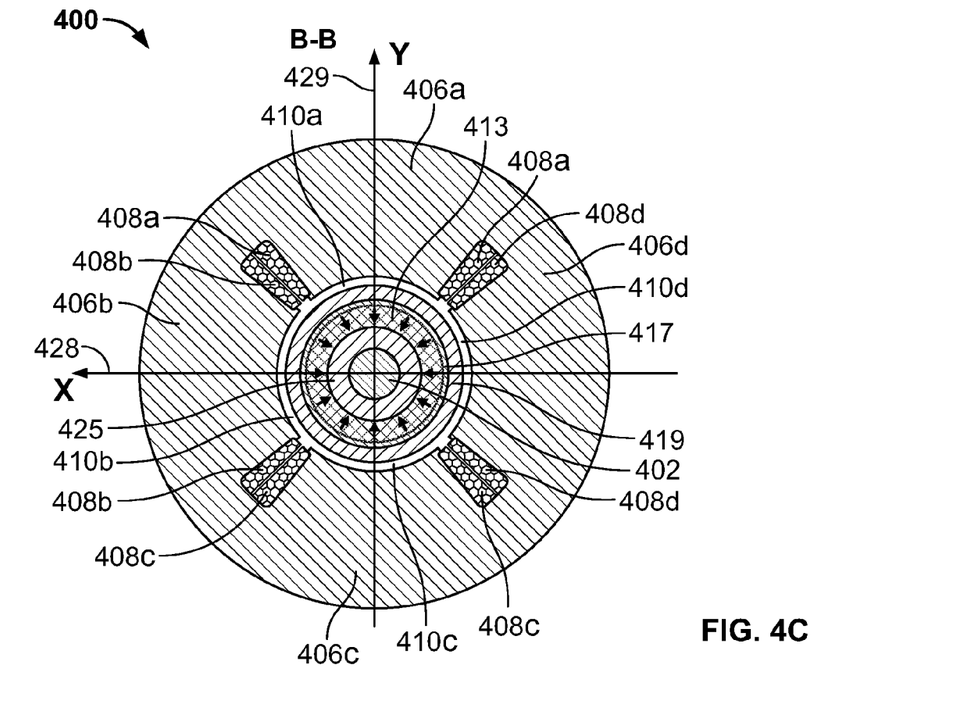

As illustrated in FIG. 4, the radial poles 405a-d and 406a-d, the target poles 418 and 419, magnets 411-413, and the soft-magnetic sleeves 416 and 417 form a magnetic bias circuit. Magnets 411-413 produce bias magnetic flux 415 in the bias magnetic circuit. In the embodiment of FIG. 4, beginning hypothetically at spacer 433, bias flux 415 propagates from the spacer 433 radially through the radial poles 406a-d, across the air gaps 410a-d, into the target pole 419, and into the backiron 425. The bias flux 415 then propagates axially, e.g., in the positive Z direction in FIG. 4, and is then directed radially through target pole 418, across the air gaps 409a-d, and radially through the radial poles 405a-d and back to spacer 433. The axially magnetized magnet 412 reduces internal magnetic flux leakage inside the moveable magnetic circuit portion 403 resulting in higher bias magnetic flux densities in the radial air gaps 409a-d and 410a-d and may not be necessary. It also may be substituted for a non-magnetic material such as a stainless steel or may be brass, Inconel®, or any strong non-magnetic material known in the art.

The embodiment shown in FIGS. 1A-C uses magnets in both the moveable portion of the magnetic circuit 103 and a stationary assembly 104, which allows for the reduction in the amount of the magnetic material in the moveable portion of the magnetic circuit 103 while also allowing for a reduction in the leakage flux between two sets of the stator radial magnetic poles 105a-d and 106a-d. The latter point is illustrated, for example, in FIG. 2A. FIG. 2A shows that both magnet 114 mounted on the stationary portion of the magnetic circuit 104 and magnets 111-113 mounted on the moveable portion of the magnetic circuit 103 produce leakage fields 240 and 242, respectively, in the axial gap 137 between the two sets of the stator radial magnetic poles 105a-d and 106a-d, respectively. However, since these fields are directed oppositely in the axial gap 137 they weaken or cancel each other. Note that in the design shown in FIG. 4, magnets 411-413 produce a low leakage fields in the axial gap 437 because this gap is shunted by the soft-magnetic spacer 433, which has much smaller magnetic reluctances. In contrast, in the design shown in FIGS. 1A-C and FIGS. 2A-C, the magnet 114 has a large magnetic reluctance and the magnetic field generated by magnets 111-113 will be present in the axial gap 137, between the two sets of the stator radial magnetic poles 105a-d and 106a-d.

Figure 5:
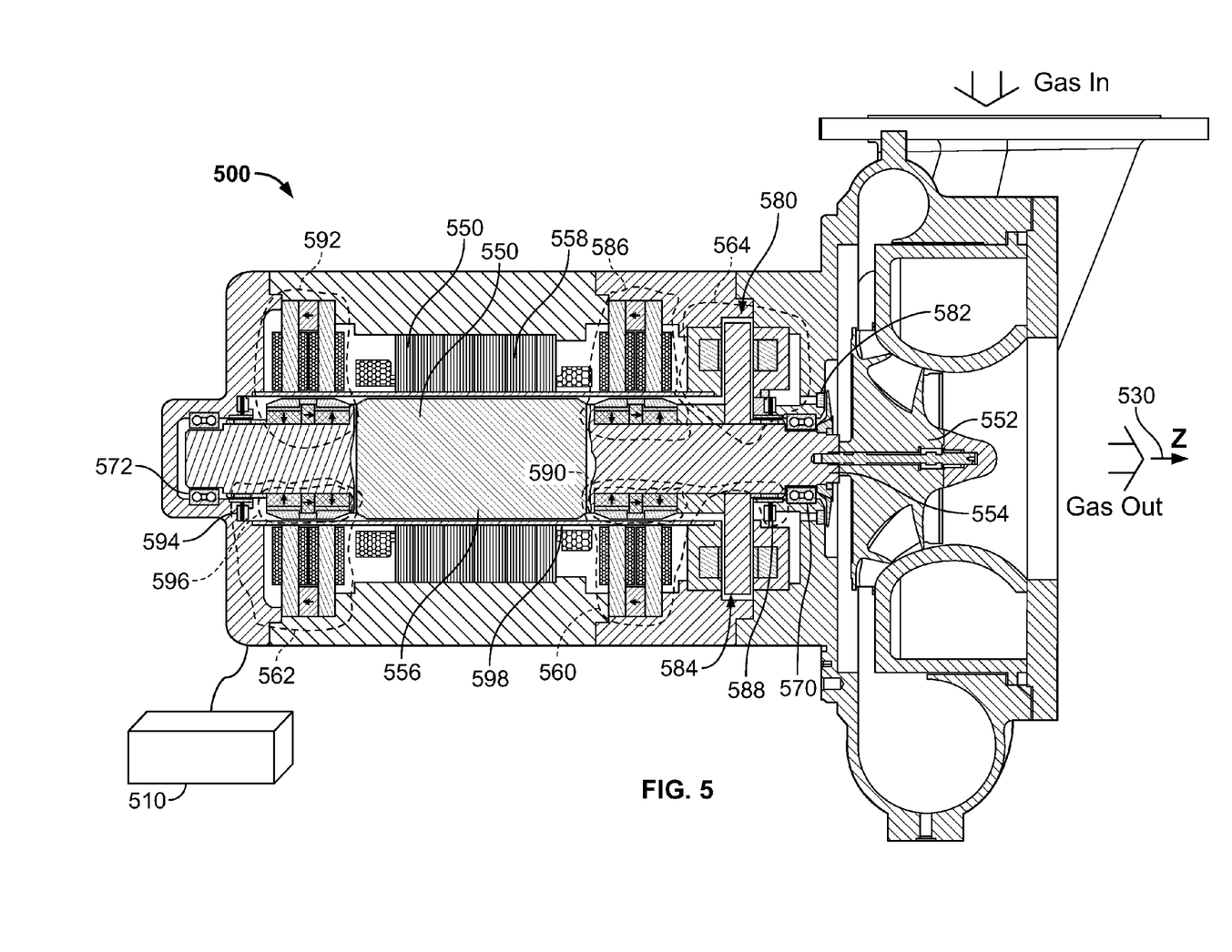
FIG. 5 is a side cross-sectional view of an electrical machine equipped with an Active Magnetic Bearing (AMB) system incorporating an embodiment of the homopolar actuator of the present disclosure.

In some aspects, the proposed radial homopolar permanent-magnet-biased electromagnetic actuator 100 may be utilized as a part of an Active Magnetic Bearing (AMB) system to support an object without a mechanical contact. FIG. 5 shows an example of using an AMB system in a rotational electric machine 500. The rotational electric machine 500 can be, for example, an electric compressor including an electric motor 550 driving an impeller 552 mounted directly on the motor shaft 554. The electric motor 550 shown in FIG. 5 has a rotor 556 and a stator 558. Alternatively, the impeller 552 can be driven by a flow of gas or liquid and spin the rotor 556 attached to it through the shaft 554. In this case, the motor 550 can be used as a generator. In embodiments, the rotor 556 of the electric machine 500 can be supported without mechanical contact by means of front and rear radial AMBs 560 and 562 in combination with axial AMB 564. When the AMBs 560, 562, and 564 are not working, the rotor rests on the mechanical backup bearings 570 and 572. The front backup bearing 570 provides the axial support of the entire rotor 556 and a radial support of the rotor front end, whereas the rear backup bearing 572 provides only radial support of the rear end of the rotor 556. There are sufficient radial clearances between the inner diameters of the mechanical backup bearings 570, 572 and the outer diameters of the rotor portions interfacing with those bearings to allow the rotor 556 to be positioned radially without touching the backup bearings 570, 572 when the AMBs 560 and 562 are activated. Similarly, there are sufficient axial clearances between the backup bearings 570, 572 and the portions of the rotor 556 interfacing with those bearings to allow the rotor 556 to be positioned axially without touching the backup bearings 570 and 572 when the axial AMB 564 is activated.

The axial AMB 564 may include an electromagnetic actuator 580, axial position sensor 582 and control electronics 510. The electromagnetic actuator 580 serves to exert forces on the axial actuator target 584 firmly mounted on the rotor 556 in the direction of the Z-axis 530 (axial direction). The front radial AMB 560 may include an electromagnetic actuator 586 per present disclosure, front radial position sensors 588 and control electronics 510. The electromagnetic actuator 586 is capable of exerting radial forces on the actuator target 590 firmly mounted on the front end of the rotor 556. The rear radial AMB 562 may include an electromagnetic actuator 592 per present disclosure, rear radial position sensors 594 and control electronics 510. The electromagnetic actuator 592 is capable of exerting radial forces on the actuator target 596 firmly mounted on the rear end of the rotor 556.

Signals from the axial position sensor 582 and radial position sensors 588 and 594 are input into the control electronics 510, which generates currents in the control coils of the electromagnetic actuators 580, 586 and 592 whenever it finds that the rotor is deflected from the desired position such that these currents produce forces pushing the rotor back to the desired position.

In some applications it is desirable to prevent access of the working gas or fluid to the windings and other stationary parts of the motor/generator and magnetic bearings. In FIG. 5, this is achieved by using a can 598 separating a cavity with the rotor 556 from the stationary parts of the motor/generator 550 and radial AMBs 560 and 562. Because the thickness of the can is added to radial gaps separating stationary portions of the radial AMBs 560 and 562 from the corresponding actuator targets 590 and 596, the system shown in FIG. 5 would benefit from the actuator of the present disclosure, which allows increasing the forces produced by AMBs 560 and 562 in case of large air gaps without increasing their footprints.

In other applications it may not be required to isolate stationary parts of the motor/generator and magnetic bearings from processing gases or fluids, but large clearances between the stationary and rotating parts may be needed if large particles are present in the processing gases or fluids which may cause a machine seizure if stuck in small clearances. These applications would also benefit from the actuator of the present disclosure.

A number of embodiments have been described. Nevertheless, it will be understood that various modifications may be made without departing from the concepts described herein. Accordingly, other embodiments are within the scope of the following claims.

What is claimed is:

1. An electromagnetic actuator comprising:
   an actuator target having a rotational axis, the target comprising:
      a target magnetic element arranged circumferentially around the rotational axis and having inner and outer magnetic poles, the inner magnetic pole located closer to the rotational axis than the outer magnetic pole, and
      a cylindrical soft-magnetic target pole piece magnetically coupled to the outer cylindrical magnetic pole of the target magnetic element;
   an actuator base comprising:
      a plurality of radial poles arranged circumferentially around and radially spaced apart from the cylindrical soft-magnetic target pole piece, the plurality of radial poles and the cylindrical soft-magnetic target pole piece defining radial gaps therebetween, and
      a plurality of control coils around the plurality of radial poles; and
   the plurality of radial poles and the cylindrical soft-magnetic target pole, magnetically coupled and defining a plurality of magnetic control circuits, the plurality of control coils configured to produce control magnetic fluxes in the plurality of magnetic control circuits, and the target magnetic element, the cylindrical soft-magnetic target pole, and the plurality of radial poles magnetically coupled and defining a magnetic bias circuit, the magnetic element configured to produce bias magnetic flux in the magnetic bias circuit.

2. The electromagnetic actuator of claim 1, wherein the actuator target further comprises a target bias magnetic flux return element magnetically coupled to the inner magnetic pole of the target magnetic element, the target bias magnetic flux return element further defining the magnetic bias circuit.

3. The electromagnetic actuator of claim 2, wherein the target bias magnetic flux return element comprises a soft-magnetic structure.

4. The electromagnetic actuator of claim 1, wherein the target magnetic element is a first target magnetic element and the cylindrical soft-magnetic target pole piece is a first cylindrical soft-magnetic target pole piece; and the actuator target further comprising:
- a second target magnetic element having inner and outer cylindrical magnetic poles arranged circumferentially around the rotational axis, the inner magnetic pole of the second target magnetic element located closer to the rotational axis than the outer magnetic pole of the second target magnetic element, the polarities of the inner and outer magnetic poles of the second target magnetic element opposite to polarities of the inner and outer magnetic poles of the first target magnetic element; and
- a second cylindrical soft-magnetic target pole attached to the outer cylindrical magnetic pole of the second target magnetic element.

5. The electromagnetic actuator of claim 4 further including a third target magnetic element located axially in between the first and the second target magnetic elements and having a first disk-shaped magnetic pole and a second disk-shaped magnetic pole arranged circumferentially around the rotational axis; the first disk-shaped pole adjacent the first target magnetic element and having the same polarity as the outer cylindrical pole of the first target magnetic element; the second disk-shaped pole adjacent the second target magnetic element and having the same polarity as the outer cylindrical pole of the second target magnetic element.

6. The electromagnetic actuator of claim 1 wherein the actuator base further comprises a base bias magnetic flux return element magnetically coupled to the plurality of radial poles and further defining the magnetic bias circuit.

7. The electromagnetic actuator of claim 6 wherein the base bias magnetic flux return element comprises a stationary soft-magnetic cylindrical pole.

8. The electromagnetic actuator of claim 4 wherein the plurality of radial poles is a first plurality of radial poles, the plurality of control coils is a first plurality of control coils, and the plurality of magnetic control circuits is a first plurality of magnetic control circuits and the base bias magnetic flux return element further comprising:
- a second plurality of radial poles arranged circumferentially around and radially spaced apart from the second cylindrical soft-magnetic target pole piece, the second plurality of radial poles and the second cylindrical soft-magnetic target pole piece defining air gaps therebetween;
- a second plurality of control coils around the second plurality of radial poles; and
- the second plurality of radial poles and the second cylindrical soft-magnetic target pole piece magnetically coupled and defining a second plurality of magnetic control circuits, the second plurality of control coils configured to produce control magnetic fluxes in the second plurality of magnetic control circuits.

9. The electromagnetic actuator of claim 6 further comprising a base magnetic element having a first pole and a second pole, the first pole magnetically coupled to the plurality of radial poles and having the polarity opposite to a polarity of the outer pole of the target magnetic element and the second pole magnetically coupled to the base bias magnetic flux return element.

10. The electromagnetic actuator of claim 6 further comprising a soft-magnetic spacer installed between and magnetically coupled to the plurality of the radial poles and the base bias magnetic flux return element.

11. An electric machine system comprising:
- a stator;
- a rotor having a rotational axis configured to move relative to the stator;
- an electromagnetic actuator sub-assembly comprising:
  - an actuator target coupled to the rotor, the target comprising:
    - a target magnetic element arranged circumferentially around the rotational axis and having inner and outer magnetic poles, the inner magnetic pole located closer to the rotational axis than the outer magnetic pole, and
    - a cylindrical soft-magnetic target pole piece magnetically coupled to the outer cylindrical magnetic pole of the target magnetic element;
  - an actuator base coupled to the stator, the actuator base comprising:
    - a plurality of radial poles arranged circumferentially around and radially spaced apart from the cylindrical soft-magnetic target pole piece, the plurality of radial poles and the cylindrical soft-magnetic target pole piece defining radial gaps therebetween, and
    - a plurality of control coils around the plurality of radial poles;
  - the plurality of radial poles and the cylindrical soft-magnetic target pole, magnetically coupled and defining a plurality of magnetic control circuits, the plurality of control coils configured to produce control magnetic fluxes in the plurality of magnetic control circuits, and the target magnetic element, the cylindrical soft-magnetic target pole, and the plurality of radial poles magnetically coupled and defining a magnetic bias circuit, the magnetic element configured to produce bias magnetic flux in the magnetic bias circuit;
- one or more position sensors configured to sense a position of the body; and
- at least one control electronics package configured to control the magnetic flux in the plurality of magnetic control circuits.

12. The system of claim 11 wherein the body is coupled to a driven load, the driven load comprising at least one of a flywheel, a compressor, a generator, or an expander.

13. The system of claim 11 wherein the body is coupled to a driver, the driver comprising at least one of a motor, an engine, or a turbine.

14. The system of claim 11 wherein the electronic control package is configured to control the magnetic fluxes in the radial magnetic control circuits by energizing the control coil around each of the plurality of radial poles with a control current.

15. The system of claim 14 wherein the magnetic fluxes exert radial electromagnetic forces on the actuator target.

16. The system of claim 15 wherein the electronic control package is further configured to energize the control coils around each of the plurality of radial poles with control currents in response to changes of signals from the position sensors so that the rotor is supported by electromagnetic forces without a mechanical contact with the stator.

17. The system of claim 11 further comprising a can separating the body from the base configured to prevent access of a working fluid to at least the control coils.

18. A method for exerting a radial force on a body, the body configured to rotate about a rotational axis, the method comprising:
- generating a bias magnetic flux with a target magnetic element mounted on the body circumferentially around the rotational axis and having inner and outer magnetic poles, the inner magnetic pole located closer to the rotational axis than the outer magnetic pole;
- communicating the bias magnetic flux between a first radial pole assembly, the body, and a second radial pole assembly, the first and second radial pole assemblies magnetically coupled and spaced apart from one another along the rotational axis, the first and second radial pole assemblies each circumferentially arranged around the rotational axis, and the first and second radial pole assemblies separated from the body by an air gap, the bias magnetic flux propagating through the body in a direction parallel to the rotational axis;
- communicating a first radial control magnetic flux between the first radial pole assembly and a first body pole coupled to the body, the first radial control magnetic flux propagating between a first radial pole of the first pole assembly, the body pole, and a second pole of the first pole assembly, the first radial control magnetic flux propagating in a radial direction orthogonal to the rotational axis; and
- communicating a second radial control magnetic flux between the second radial pole assembly and a second body pole coupled to the body and spaced apart from the first body pole along the rotational axis, the second radial control magnetic flux propagating between a first radial pole of the second pole assembly, the second body pole, and a second pole of the second pole assembly, the second radial control magnetic flux propagating in a radial direction orthogonal to the rotational axis opposite from the first radial control magnetic flux, the bias magnetic flux and the first and second control magnetic fluxes combining to affect an electromagnetic force on the actuator target.

19. The method of claim 18 wherein the bias magnetic flux generated by the target magnetic element is a first bias magnetic flux; and the method further comprising generating a second bias magnetic flux with a base magnetic element residing between the first and second radial poles assemblies, the second bias magnetic flux combining with the first bias magnetic flux.

20. The method of claim 18 wherein communicating a first and second radial control magnetic fluxes further comprises:
- energizing a control coil around each of the first and second radial poles of the first and second radial pole assemblies with a control current, the control current in each of the control coils capable of variation based on the desired magnitude of the first and second radial control magnetic fluxes.

* * * * *